United States Patent

[11] 3,602,054

| [72] | Inventors | Donald A. Monteith<br>Jackson;<br>William G. Robison, Alpha, both of, Minn. |
|---|---|---|
| [21] | Appl. No. | 9,534 |
| [22] | Filed | Feb. 9, 1970 |
| [45] | Patented | Aug. 31, 1971 |
| [73] | Assignee | AG-Chem Equipment Co., Inc.<br>Minneapolis, Minn. |

[54] CHAIN AND BELT TIGHTENER
5 Claims, 3 Drawing Figs.

[52] U.S. Cl. .................................................. 74/242.9,
  74/242.11 R, 74/242.15 R
[51] Int. Cl. ............................................. F16h 7/08,
  F16h 7/12, F16h 7/10
[50] Field of Search.............................. 74/242.9,
  242.11 A, 242.11 C, 242.11 R, 242.1 A, 242.1 R,
  242.15 R

[56] References Cited
UNITED STATES PATENTS

| 1,108,085 | 8/1914 | Sewall | 74/242.9 |
|---|---|---|---|
| 2,066,721 | 1/1937 | Eaton | 74/242.9 |
| 2,876,450 | 3/1959 | Eodleblute | 74/242.9 UX |
| 3,413,865 | 12/1968 | Nimtz et al. | 74/242.9 |

*Primary Examiner*—Leonard H. Gerin
*Attorney*—Orrin M. Haugen

ABSTRACT: Chain tightener means for power transmission systems including a driver pulley and a driven pulley and having an endless flexible coupling means extending therebetween defining a normal tension span and a normal slack span, the tightener means extending between said spans and including a pair of idler pulleys disposed outwardly of the spans with spacer means adjustably spacing said idler pulleys apart a predetermined distance, each of said idler pulleys being journaled for rotation about idler spindles secured to ends of individual elongated support arm means, said support arm means having opposed ends with a shank zone therebetween; means pivotally mounting each of said support arms at intermediate points along the shank zone and about support points spaced from said idler spindles to permit simultaneous rockable shifting of each of said support arms about said support points; and coupling means secured adjacent to the opposed end of at least one of said support arm means for securing said arm to shock absorber means, said shock absorber means reversibly resisting and decelerating shifting motion of said support arms.

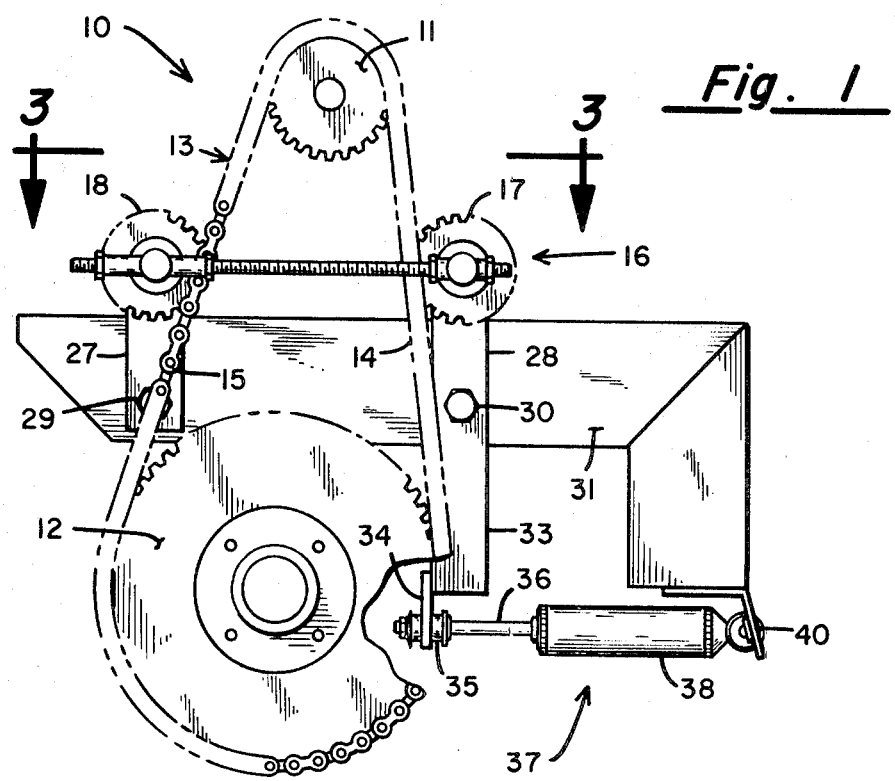
Fig. 1
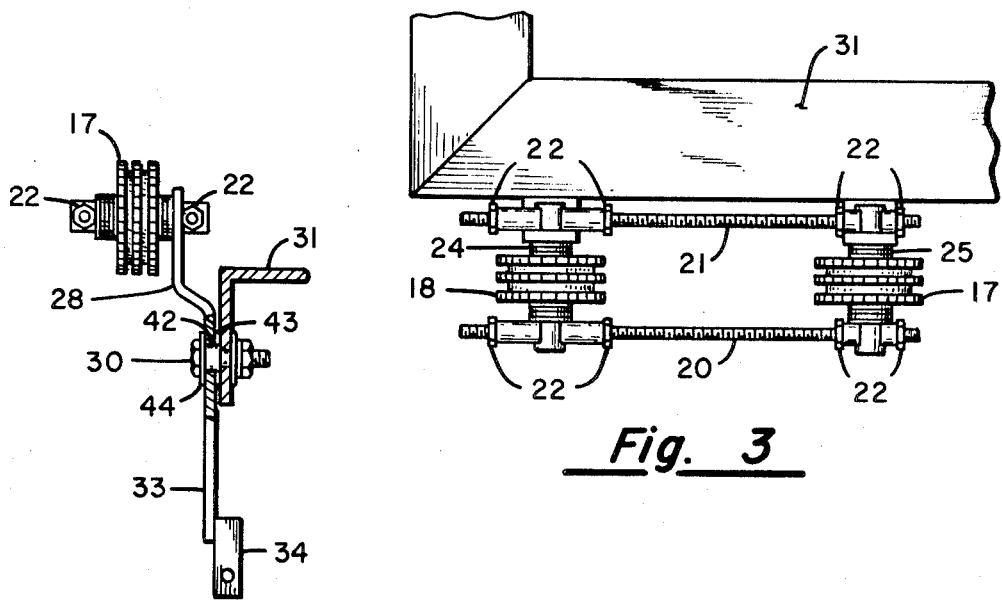
Fig. 2
Fig. 3
INVENTORS
DONALD A. MONTEITH
WILLIAM G. ROBISON
BY *Chris M. Haugen*
ATTORNEY

CHAIN AND BELT TIGHTENER

The present invention relates generally to chain tightener means, and more specifically to an improved type of chain tightener means which maintains the load carrying side or span of the chain taut, while, at the same time, eliminating excessive slack in the slack span. The chain tightener apparatus of the present invention is characterized in that only minimal loads are placed on the tightener, and the use of mechanically biased idlers or dancers is eliminated.

In accordance with the present invention, a chain tightener means is provided which includes a pair of idler pulleys disposed outwardly of the normal tension or power-carrying span of the chain and the normal slack span of the chain. Means are provided to adjustably space the idlers apart by a predetermined distance, each of the idlers being journaled for rotation about idler spindles mounted or secured to the free ends of individual support arms. These support arms are mounted for pivotal rotation about a suitable mounting point spaced from the idler spindles, the arrangement being such that simultaneous rockable shifting is possible with the support arms. At the opposite end of at least one of the support arms, shock absorber means are provided which reversibly resist and decelerate shifting motion of the support arm, thereby providing for smooth motion of the tightener about the support points for the arms in response to shock loading. It will be appreciated, therefore, that mechanically biased means need not be employed to control shock loading of the chain, and the system accordingly operates with only modest tension being introduced into the system by the tightener means.

Therefore, it is a principal object of the present invention to provide an improved chain tightener means which utilizes a pair of spaced-apart idler members mounted outwardly of the chain spans, and being adapted to shift in response to changes in loading of the tension span of the chain, the shifting motion of the idlers being reversibly resisted and decelerated by shock absorber means.

It is yet a further object of the present invention to provide an improved chain tightener means which is particularly adapted for use with endless chain members flexible about the axis of motion, the tightener means utilizing a pair of spaced-apart idler pulleys disposed outwardly of the tension and slack spans of the chain, the idler pulleys being adapted to shift in response to changes in loading of the tension span, this shifting being reversibly resisted without the introduction of unidirectional mechanical bias.

Other and further objects of the present invention will become apparent to those skilled in the art upon a study of the following specification, appended claims, and accompanying drawing, wherein;

FIG. 1 is a detail elevational view, partially broken away, of the chain tightener means of the present invention, the chain tightener being employed in combination with a conventional driver pulley and driven pulley arrangement;

FIG. 2 is a detail side elevational view of the support arm carrying one of the idlers utilized in the arrangement illustrated in FIG. 1; and FIG. 3 is a top plan view of the idler pulley assembly of the arrangement shown in FIG. 1, FIG. 3 being taken generally along the line and in the direction of the arrows 3—3 of FIG. 1, FIG. 3 showing the chain removed from the structure.

In accordance with the preferred modification of the present invention, and with particular attention being directed to FIG. 1 of the drawing, the chain tightener means generally designated 10 includes a driver pulley 11 along with its driven pulley 12, chain generally designated 13 being utilized to mechanically couple pulleys 11 and 12 together. Chain 13 is provided with a normal tension span 14 and a normal slack span 15, the loading of the tension span being, of course, a function of the loading of the system. The tightener means 10 includes an idler pulley assembly generally designated 16, this assembly including a pair of oppositely disposed idler pulley or sprocket members 17 and 18, these members being adapted to engage the endless flexible coupling means such as the chain 13 outwardly of the tension and slack spans. Adjustable spacer means such as the threaded rods 20 and 21 are employed to maintain the pulleys 17 and 18 in predetermined spaced-apart relationship, depending upon the extent of the gap existing between the tension span and slack span at the point of attachment. Adjusting means in the form of locknuts 22—22 are normally employed to control the position of the pulleys along the rods 20 and 21. As is apparent from FIGS. 2 and 3, the idler pulleys are each journaled for rotation about idler spindles such as the spindles 24 and 25, these spindles being, in turn, secured to the ends of individual support arms such as the arms 27 and 28. The individual support arms have shank portions which are drilled to receive pivot mount bolts 29 and 30, these pivot mount members being coupled to the frame arrangement such as is shown at 31. This pivotal mounting arrangement for the support arms permits the individual support arms to simultaneously rock or shift in response to a change in loading on the running chain member 13.

At the opposite or opposed end of arm 28, such as at 33, a coupling scheme shown at 34 is utilized to join that end of arm 28 to the tip end 35 of piston arm 36, piston arm 36 being a part of the chock absorber assembly shown generally at 37. In addition, the shock absorber 37 includes a cylinder member 38 which contains fluid for damping and resisting motion of piston arm 36 relative to cylinder 38. As is conventional in this type of system, the opposed end of the shock absorber 37 is mounted to the system as at 40.

With continued attention being directed to FIG. 1, it will be observed that the pivot points for the support arms and the idler spindles for the idler pulleys are arranged at the respective corners of a parallelogram. The angular disposition of these members, one to another, will change or shift in response to changes in the loading of the tension span of chain 13.

When mounted on a typical system, the individual idlers 17 and 18 will be spaced apart a distance which is sufficiently close to take up a substantial portion of the slack existing in the slack span of the chain 13. As the driver pulley rotates with its driving shaft (not shown), tension will increase in the tension span 14, and the idlers 17 and 18 will respond by moving in a clockwise direction about the respective pivot points 29 and 30. When deceleration occurs in the system, idlers 17 and 18 respond by moving in a counterclockwise direction about their respective pivot points. This shifting of the idlers is reversibly resisted and decelerated by the shock absorber means 37, thus the motion is effectively damped and extreme shock loading on the chain is avoided.

The system of the present invention permits the tightener to be operated with minimum loads being applied to the system, and therefore longer life is obtained for both the sprockets and the chain components of the system. Furthermore, idler bearings are not subjected to heavy loading, and centrifugal force loads which tend to stretch chains are substantially reduced.

In order to enhance the smoothness of operation, means are provided to eliminate friction in the pivotal motion of the arms 27 and 28 about their respective pivot points 29 and 30. With attention being directed to FIG. 2 of the drawing, a suitable bushing is employed at 42, this bushing being, of course, disposed in the bore formed in the arm 28. If desired, suitable antifriction washer means may be employed between the arm 28 and the support 31, such as is shown at 43. A similar antifriction washer may be employed at 44, if desired.

It will be appreciated that individual bearing means may be employed with the idlers 17 and 18. Either roller or needle bearings may be employed for this purpose. The shock absorber structure 37 is preferably an automobile-type shock absorber having a capability of reversibly resisting decelerating shifting motion of the piston arm relative to the cylinder 38. THis device has the advantage of resisting shifting from any given datum point, this resistance to shifting being generally independent of the immediate disposition of the arm 36 relative to the cylinder 38. One suitable shock absorber which has been found useful for this purpose is identified by code No. 2006, the shock absorber being available from Monroe Auto Equipment Company, Monroe Michigan.

The apparatus of the present invention, while particularly adapted for use in connection with chain and sprocket drives, is equally adaptable for use with any flexible coupling means such as a textile belt-pulley arrangement. The function is, of course, identical in such a system.

Whenever sprockets or pulleys having different diameters are employed in a single system, the tension span and slack span of the chain will be angularly disposed, one to another. In such arrangements, it is advisable for the designer to utilize a spacing between the pivot points of the support arms and the mounting points for the idler spindles which is sufficiently large so as to minimize or reduce the shifting motion of the idlers along the length of the angularly disposed spans. In other words, as the arms 27 and 28 rock about the points 29 and 30, the immediate disposition of the axis of the rods 20 and 21 relative to the rotational axis of the sprockets 11 and 12 will shift, thereby changing the bias introduced into the chain.

In some cases, it may be desirable to arrange the axes of support arms 27 and 28 in an angularly converging disposition. Normally, these axes will be arranged to converge in the same general direction as the tension span and slack span of the chain 13.

What is claimed is:

1. Chain tightener means comprising:
   a. a driver pulley and a driven pulley having endless flexible coupling means extending therebetween and defining a normal tension span and a normal slack span;
   b. tightener means extending between said spans comprising a pair of idler pulleys disposed outwardly of said spans with spacer means adjustably spacing said idler pulleys apart by a predetermined distance, each of said idler pulleys being journaled for rotation about idler spindles secured to the ends of individual elongated support arm means, said support arm means having opposed ends with a shank zone therebetween;
   c. means pivotally mounting each of said support arms at intermediate points along the shank zone of said elongated support arm means and about support points spaced from said idler spindles to permit simultaneous rockable shifting of each of said support arms about said support points;
   d. coupling means secured adjacent to the opposed end of at least one of said support arm means for securing said arm to shock absorber means, said shock absorber means reversibly resisting and decelerating shifting motion of said support arms.

2. A chain tightener means as defined in claim 1 being particularly characterized in that said flexible coupling means is an endless chain flexible in one plane about its motion axis, and wherein said driver pulley, driven pulley, and idler pulleys are toothed sprockets.

3. The chain tightener means as defined in claim 1 being particularly characterized in that the pivot points for each of said support arms, and said idler spindles are arranged at the respective corners of a parallelogram.

4. The chain tightener means as defined in claim 1 being particularly characterized in that said idler pulleys are spaced apart a predetermined distance which biases said tension span and slack span inwardly.

5. The chain tightener means as defined in claim 1 being particularly characterized in that said shock absorber comprises a piston arm disposed within a hydraulic cylinder, the motion of the piston arm within the cylinder being hydraulically damped.